United States Patent
Buriano et al.

(10) Patent No.: US 10,680,909 B2
(45) Date of Patent: Jun. 9, 2020

(54) QUALITY OF EXPERIENCE MONITORING SYSTEM AND METHOD FOR INFORMATION CONTENT DISTRIBUTED THROUGH A TELECOMMUNICATIONS NETWORK

(71) Applicant: TELECOM ITALIA S.p.A., Milan (IT)

(72) Inventors: Luca Buriano, Turin (IT); Virginio Mario Costamagna, Turin (IT); Pia Maria Maccario, Turin (IT); Claudio Teisa, Leini (IT)

(73) Assignee: TELECOM ITALIA S.p.A., Milan (IT)

( * ) Notice: Subject to any disclaimer, the term of this patent is extended or adjusted under 35 U.S.C. 154(b) by 15 days.

(21) Appl. No.: 15/778,439

(22) PCT Filed: Dec. 14, 2015

(86) PCT No.: PCT/EP2015/079518
§ 371 (c)(1),
(2) Date: May 23, 2018

(87) PCT Pub. No.: WO2017/101961
PCT Pub. Date: Jun. 22, 2017

(65) Prior Publication Data
US 2018/0351829 A1 Dec. 6, 2018

(51) Int. Cl.
*G06F 13/00* (2006.01)
*H04L 12/24* (2006.01)
(Continued)

(52) U.S. Cl.
CPC ........ *H04L 41/5009* (2013.01); *H04L 41/509* (2013.01); *H04L 41/5038* (2013.01);
(Continued)

(58) Field of Classification Search
CPC ..... G06F 13/00; H04L 12/2602; H04L 29/06; H04L 29/08072; H04L 41/22;
(Continued)

(56) References Cited

U.S. PATENT DOCUMENTS

| | | | |
|---|---|---|---|
| 7,542,881 B1 * | 6/2009 | Billiotte | G05B 17/02 703/2 |
| 2002/0116545 A1 * | 8/2002 | Mandato | H04L 29/06027 719/328 |

(Continued)

FOREIGN PATENT DOCUMENTS

FR  2 992 809 A1  1/2014

OTHER PUBLICATIONS

International Search Report dated Jul. 15, 2017, in PCT/EP2015/079518 filed Dec. 14, 2015.
(Continued)

*Primary Examiner* — Robert B Harrell
(74) *Attorney, Agent, or Firm* — Oblon, McClelland, Maier & Neustadt, L.L.P.

(57) ABSTRACT

A method for estimating a quality of experience of a user receiving an information content stream distributed through a telecommunications network is provided comprising: generating a user behavior model, depicting a behavior of the user in the interaction with the telecommunications network; implementing the user behavior model by selecting combinations of user behavior; providing monitoring units adapted to perform measures on specific parameters of the information content stream; setting the monitoring; assigning to the monitoring units test cycles comprising interaction operations with the telecommunications network; generating for each monitoring unit a corresponding script to be executed by the monitoring unit; at the monitoring units, carrying out the test cycles by running the generated scripts, and carrying
(Continued)

out measurements on parameters of the information content stream received in response to the test cycles to obtain acquired measured values, and calculating quality of experience indicators by processing the acquired measured values.

10 Claims, 2 Drawing Sheets

(51) Int. Cl.
  *H04L 29/08* (2006.01)
  *H04L 12/26* (2006.01)
(52) U.S. Cl.
  CPC .............. *H04L 43/50* (2013.01); *H04L 67/22* (2013.01); *H04L 43/10* (2013.01); *H04L 67/306* (2013.01)
(58) Field of Classification Search
  CPC . H04L 43/00; H04L 41/5009; H04L 41/5038; H04L 43/10; H04L 43/50; H04L 67/22; H04L 67/306; H04L 12/24; H04L 29/08; H04L 41/509

USPC ......................................................... 709/224
  See application file for complete search history.

(56) References Cited

U.S. PATENT DOCUMENTS

| | | |
|---|---|---|
| 2010/0268524 A1 | 10/2010 | Nath et al. |
| 2014/0160971 A1* | 6/2014 | Ketonen ............... H04L 41/147 370/252 |
| 2014/0160972 A1* | 6/2014 | Ketonen ............... H04L 41/147 370/252 |
| 2015/0052246 A1 | 2/2015 | Kordasiewicz et al. |

OTHER PUBLICATIONS

Written Opinion of the International Searching Authority dated Jul. 15, 2017, for PCT/EP2015/079518 filed Dec. 14, 2015.

* cited by examiner

QUALITY OF EXPERIENCE MONITORING SYSTEM AND METHOD FOR INFORMATION CONTENT DISTRIBUTED THROUGH A TELECOMMUNICATIONS NETWORK

BACKGROUND OF THE INVENTION

Field of the Invention

The present invention generally relates to the field of telecommunications, and more specifically to the distribution of audio (voice, music, audio clips and the like) and/or video (e.g., video clips, movies) contents, e.g. multimedia contents, through telecommunications networks.

Description of the Related Art

Thanks to the technology evolution, the bandwidth available in telecommunications networks, using both fixed and mobile devices, has become broad enough to support the development of new services on a massive scale. Among this kind of services, the distribution of streams of audio and/or video contents, e.g. multimedia contents, is one of the most important. Streaming distribution of audio and/or video or multimedia contents is used for example for performing VoIP (Voice over Internet Protocol) phone calls, videocalls, for listening music through, e.g., Internet radio channels, IPTV (IP television), Video on Demand (VOD), content sharing.

In this context, an efficient usage of the available network resources and the ability to measure the quality of the services offered to the customers are important aspects and can determine the success for any player on the market; this is in particular true for telecommunications operators like Telcos, because they can leverage their own networks for providing these services.

The distribution of multimedia content streams in IP (Internet Protocol) network contexts requires to tackle many issues, coming from the specific context itself and from the users' perception and expectation.

The problem of measuring the quality of audio and/or video streaming distribution starting from the analysis of the network used for the provisioning and fruition of such contents has already been addressed in the art.

However, traditional methods of measurement, based on measuring network parameters without estimating the correlation among them, fail to estimate the quality of service from an end user point of view.

The coexistence of two different points of view for measuring the performance with which a content is exploited by a user (i.e., from the user itself point of view and from the point of view of the content provider) is a problem that has been faced in the art.

On this regard, the document DSL Forum, TR-126 "Triple-play Services Quality of Experience (QoE) Requirements", 13 Dec. 2006, provides the following two definitions.

"Quality of Experience (QoE):—is the overall performance of a system from the point of view of the users. QoE is a measure of end-to-end performance at the services level from the user perspective and an indication of how well the system meets the user's needs.

Quality of Service (QoS):—is a measure of performance at the packet level from the network perspective. Quality of Service (QoS) also refers to a set of technologies (QoS mechanisms) that enable the network operator to manage the effects of congestion on application performance as well as providing differentiated service to selected network traffic flows or to selected users".

A further definition of the QoE has been provided in the meeting ITU-T SG12 "Performance and quality of service Need for a standardized ITU-T Definition of QoW", 2007 Jan. 16 to 2007-01-25, according to which "Quality of Experience (QoE) is the overall acceptability of an application or service, as perceived by the end-user. Distinct from QoS, which is a subset of QoE, this overall acceptability is influenced by user expectations and context, and includes the complete end-to-end path effects (client, terminal, network, services infrastructure, etc)".

The ITU-T Recommendation E.800 "Telephone network and ISDN quality of service, network management and traffic engineering: terms and definitions related to quality of service and network performance including dependability", August 1994 defines QoS as "the collective effect of service performance which determine the degree of satisfaction of a user of the service" and QoE as "the term describing users' subjective perception of a system, application, event, or service relative to their expectations. QoE measurement involves human analysis. However where human analysis is not possible one can estimate QoE using metrics which capture and quantify objective characteristics of a service or application that affect human perception. This type of QoE estimation can be subsequently translated into target requirements for the given service/application".

U.S. Pat. No. 7,197,557 discloses a system for measuring performance of streaming media sent from a server over a network. The system includes a data acquisition agent connected to the network and operable to send a request for streaming media to the server. The agent is configured to receive streaming media, collect performance measurements, and send the performance measurements to a storage device.

U.S. Pat. No. 7,373,376 discloses a method of measuring performance of a transaction over a network. The transaction includes requesting information from an information source connected to the network and interacting with the information source. The method includes connecting a data acquisition agent to the network, sending a request for information from the data acquisition agent to the information source, and loading data responsive to the request for information onto the data acquisition agent. The transaction is executed and performance measurements for the transactions are collected and sent to a storage device. A system for measuring performance of a transaction over a network is also disclosed.

U.S. Pat. No. 7,197,559 discloses a system for monitoring the post-deployment performance of a web-based or other transactional server. The monitoring system includes an agent component that monitors the performance of the transactional server as seen from one or more geographic locations and reports the performance data to a reports server and/or centralized database. The performance data may include, for example, transaction response times, server response times, network response times and measured segment delays along network paths. Using the reported performance data, the system provides a breakdown of time involved in completion of a transaction into multiple time components, including a network time and a server time. Users view the transaction breakdown data via a series of customizable reports, which assist the user in determining whether the source of the performance problem resides primarily with the transactional server or with the network. Additional features permit the source to be identified with further granularity.

Applicant has found that none of the abovementioned solutions known in the art is capable of estimating the Quality of Experience (QoE) as perceived by a wide range of different users having different behaviors while enjoying the fruition of a wide range of different kinds of multimedia content using a wide range of different user equipments. Indeed, the agents according to the solutions already known in the art provide for carrying out the same operations, and are not capable of reflecting the great diversification that occurs among the different behaviors of a plurality of different users. Moreover, while the known solutions are mainly directed to monitoring web pages navigation, it would be desirable to being capable of extending such analysis to different multimedia services as well.

In view of the above, Applicant has devised a method for estimating a quality of experience of a user receiving an information content stream distributed through a telecommunications network.

The method comprises generating a user behavior model, depicting a behavior of the user in the interaction with the telecommunications network, by considering a corresponding set of user behavior dimensions. Each user behavior dimension is a descriptor describing a corresponding feature of said behavior.

The method further comprises implementing said user behavior model by selecting combinations of user behavior dimensions of said set of user behavior dimensions.

The method further comprises providing monitoring units adapted to perform measures on specific parameters of the information content stream and to emulate the behavior of the user in the interaction with the telecommunications.

The method further comprises setting the monitoring units. Said setting the monitoring units comprises setting the number, type and/or location of the monitoring units based on said selected combinations of user behavior dimensions.

The method further comprises assigning to the monitoring units test cycles comprising interaction operations with the telecommunications network to be carried out by said monitoring units.

The method further comprises generating for each monitoring unit a corresponding script to be executed by said monitoring unit based on said selected combinations of dimensions and said assigned test cycles. Said script comprises indications about the interaction operations of said assigned test cycles.

The method further comprises, at the monitoring units, carrying out said test cycles by running the generated scripts, and carrying out measurements on parameters of the information content stream received in response to said test cycles to obtain acquired measured values.

The method further comprises calculating quality of experience indicators by processing said acquired measured values.

According to an embodiment of the present invention, each user behavior dimension of said set of user behavior dimensions may assume a plurality of different user behavior dimension values.

According to an embodiment of the present invention, said implementing the user behavior comprises generating at least one first table comprising a plurality of first elements.

According to an embodiment of the present invention, each first element quantifies the relationship among dimension values of the dimensions of the set of dimensions.

According to an embodiment of the present invention, said step of setting the number, type and/or location of the monitoring units comprises setting the number, type and/or location of the monitoring units according to the elements of the first table.

According to an embodiment of the present invention, the method further comprises providing a set of different test typologies.

The method further comprises partitioning a test time period into a set of time slots.

According to an embodiment of the present invention, said assigning to the monitoring units test cycles comprises generating a second table comprising a plurality of second elements. Each second element provides an indication of a number of repetitions of test cycles of a corresponding test typology to be carried out during a corresponding time slot.

According to an embodiment of the present invention, the method further comprises generating a third table listing, for each monitoring unit, at least one among:
  information about a name of the monitoring unit;
  information about a geographical position of the monitoring unit;
  information about an interconnection configuration of the monitoring unit;
  information about software and/or hardware equipment of the monitoring unit;
  details of about the interaction operations to be carried out and how said interaction operations are arranged in test cycles;
  a test calendar comprising information specifying which test cycle(s) to be carries out by said monitoring unit and when.

According to an embodiment of the present invention, said generating for each monitoring unit a corresponding script comprises generating said script based on said third table.

According to an embodiment of the present invention, said generating said third table comprises generating said third table based on the first elements of the first table and on the second elements of the second table.

According to an embodiment of the present invention, said implementing said user behavior model further comprises for each test cycle to be carried out during a time slot, setting a corresponding maximum duration of said test cycle.

The method further comprises setting the second elements of the second table based on said maximum durations and on the duration of the time slots.

According to an embodiment of the present invention, the method further comprises verifying the correct operations of the monitoring units by comparing for each monitoring unit the current time with the maximum duration of the test cycle carried out by the monitoring unit.

According to an embodiment of the present invention, the method further comprises generating a fourth table listing at least one among:
  a last data transmission carried out by a monitoring unit;
  a new data transmission awaited by a monitoring unit;
  a last configuration downloaded by a monitoring unit;
  a last task wait signal by an agent unit.

According to an embodiment of the present invention, the method further comprises verifying the coherence of said acquired measured values based on the fourth table.

Another aspect of the present invention relates to a system for estimating a quality of experience of a user receiving an information content stream distributed through a telecommunications network.

The system comprises a plurality of monitoring units adapted to perform measures on specific parameters of the information content stream.

The system comprises a central unit interfaced with monitoring units.

The central unit is configured to generate a user behavior model, depicting a behavior of the user in the interaction with the telecommunications network, by considering a corresponding set of user behavior dimensions. Each user behavior dimension is a descriptor describing a corresponding feature of said behavior.

The central unit is further configured to implement said user behavior model by selecting combinations of user behavior dimensions of said set of user behavior dimensions.

The central unit is further configured to assign to the monitoring units test cycles comprising interaction operations with the telecommunications network to be carried out by said monitoring units.

The central unit is further configured to generate for each monitoring unit a corresponding script to be executed by said monitoring unit based on said selected combinations of dimensions and based on said assigned test cycles. Said script comprises indications about the interaction operations of said assigned test cycles.

According to an embodiment of the present invention, the monitoring units are configured to carry out said test cycles by running the generated scripts.

According to an embodiment of the present invention, the monitoring units are configured to carry out measurements on parameters of the information content stream received in response to said test cycles to obtain acquired measured values.

According to an embodiment of the present invention, the central unit is further configured to calculate quality of experience indicators by processing said acquired measured values.

BRIEF DESCRIPTION OF THE DRAWINGS

These and other features and advantages of the present invention will better appear from the following detailed description of some embodiments thereof, provided merely by way of non-limitative examples. The description should be read in conjunction with the attached drawings, wherein.

Figure 1:
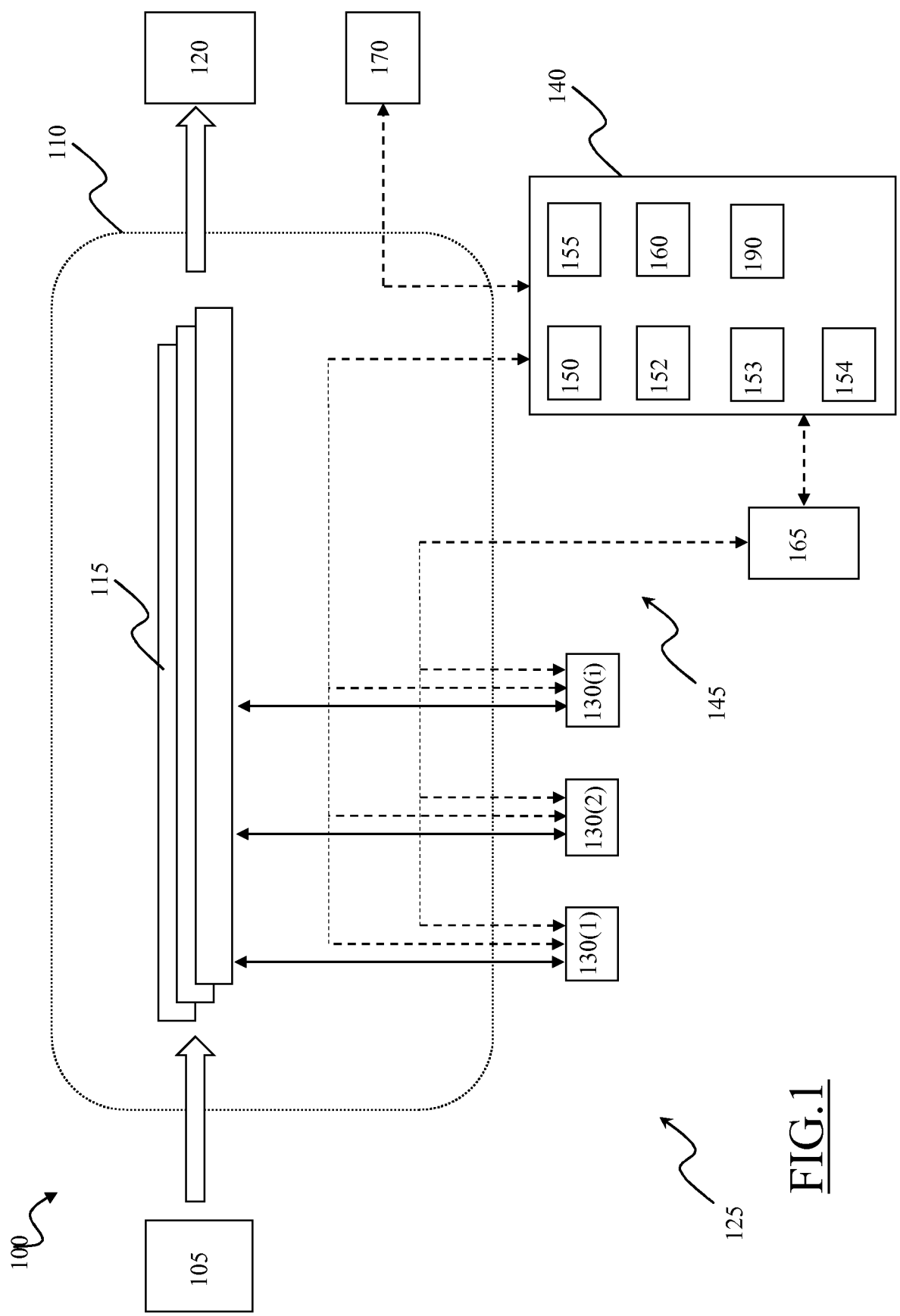
FIG. 1 schematically shows a structure of a system according to an embodiment of the present invention, for obtaining estimations of the quality of experience perceived by users enjoying multimedia contents distributed through a telecommunications network.

Making reference to the drawings, in FIG. 1 an exemplary scenario 100 is schematically shown wherein the present invention is exploitable. The scenario 100 considered is one in which audio and/or video contents, e.g. multimedia contents like for example music, clips, movies, VoIP phone calls, video calls, IPTV, VOD, shared contents and the like are distributed through a telecommunications network 110, e.g. the Internet; hereinafter, without prejudice to the generality of the invention, the distributed contents will be referred to as "multimedia contents" or "information content". The multimedia contents are made available and distributed by one or more content providers 105 in the form of data streams (e.g., streams of data packets); the generic multimedia content stream, denoted in the figure as 115, may include one or more content components (e.g., one or more audio components, and/or one or more video components), distributed by a same or by different content providers. The multimedia content stream 115 is transported by the telecommunications network 110 to a user equipment 120, connected to the network 110; exploiting the user equipment 120, the user can enjoy the multimedia content. The user equipment 120 may be a personal computer (as in the example depicted), a notebook, a laptop, a tablet, a cellular phone, a smart phone, a VoIP phone, a set-top box for IPTV, associated to a TV set, a portable media player, and in general any device having data processing capabilities and capable of communicating over the telecommunications network 110.

FIG. 1 also shows schematically the structure of a system 125 according to an embodiment of the present invention, for monitoring the multimedia content stream 115 and estimating a Quality of Experience (QoE) as perceived by the user enjoying the multimedia content using the user equipment 120.

The system, globally denoted 125, includes one or more monitoring units, referred to as agent units 130(1), 130(2), . . . , 130(i), . . . executing specifically designed software adapted to perform measures on specific parameters of one or more of the components of the multimedia content stream 115.

The agent units 130(i) are geographically distributed in various positions of the area wherein the telecommunications network 110 is located, in such a way to emulate user equipment 120 connected to the network 110. Each agent unit 130(i) is provided with hardware capable of emulating the user experience related to a specific use of a service provided by a content provider 105. For example, the agent units 130(i) may be personal computers, notebooks, laptops, tablets, smart phones, a set-top boxes for IPTV, portable media players, and so on. The agent units 130(i) are configured to run the same software used by the end users of the user equipment 120, as well as a specific software for carrying out tests emulating the behavior of end users exploiting said user equipment 120 for interacting with the telecommunications network. Each agent unit 130(i) is also configured to run a further specific software adapted to carry out measures on parameters (e.g., bandwidth, jitter, delay, response time) of the multimedia content stream 115 received during the execution of the tests. In order to protect the results of the measurements carried out by the agent units 130(i) from possible alterations, the agent units 130(i) are advantageously hardened.

The system 125 comprises a central unit 140 which is interfaced with the agent units 130(i) by means of a dedicated monitoring network 145 for acquiring and processing the measurements collected by the agent units 130(i). For this purpose, the central unit 140 is provided with an acquisition unit 150 configured to acquire values of the parameters of the multimedia content stream 115 measured by the agent units 130(i) during the execution of the tests (hereinafter, simply referred to as "measured values"); the acquisition unit 150 is coupled with a processing unit 152 configured to process the measured values acquired by the acquisition unit 150 for calculating corresponding QoE indicators indicative of the QoE as perceived by the user enjoying the multimedia content. Alternatively, a single unit may be provided carrying out the function of both the acquisition unit 150 and the processing unit 152. The central unit 140 further comprises a test scheduler unit 153 adapted to configure the tests to be carried out by the agent units 130(i) and an agent configuration unit 154 for configuring the agent units 130(i) in such a way to run the configured tests in order to emulate the behavior of end users.

The central unit 140 is further provided with a measured values repository unit 155, e.g., a memory unit, configured to store the acquired measured values, preferably only after the validity of the acquired measured values has been verified, and to store information related to the operations carried out by the corresponding agent units 130(i).

The central unit 140 further comprises a test and configuration repository unit 160, e.g., a memory unit, configured to store the details of the tests to be carried out by the various agent units 130(i) and their configurations.

The system 125 comprises a managing unit 165 interfaced with the central unit 140 and the agent units 130(i) through the monitoring network 145 for the management of the acquisition unit 150, the measured values repository unit 155, the test repository unit 160 and the agent units 130(i).

One or more measure consulting units 170 (only one illustrated in figure) are interfaced with the central unit 140 for allowing users of the system 125 to consult the acquired measured values and the corresponding QoE indicators calculated by the central unit 140.

Figure 2:
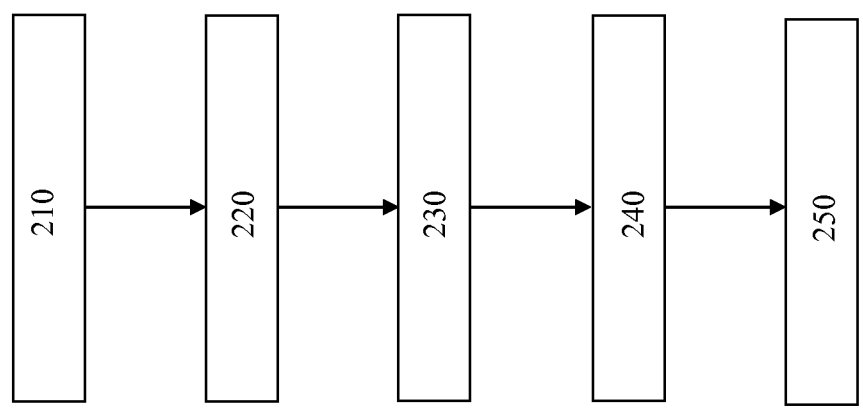
FIG. 2 is a flow chart depicting the main phases of a procedure carried out by the system of FIG. 1 for monitoring the multimedia content stream and estimating the quality of experience according to an embodiment of the present invention.

FIG. 2 is a diagram illustrating the main phases of a procedure 200 carried out by the system 125 for monitoring the multimedia content stream 115 and estimating the QoE according to an embodiment of the present invention.

The first phase 210 of the procedure 200 provides for defining a user behavior model of the users to be exploited for configuring the tests to be carried out by the agent units 130(i), and then for allocating the agent units 130(i) based on such user behavior model. The Applicant has observed that efficient user behavior models need to take into account in a very detailed way all the steps that customers typically have to carry out when they are using desired services provided by the content providers 105.

According to an embodiment of the present invention, the user behavior model depicting a user behavior to be emulated is defined by considering a corresponding set of "user behavior dimensions" of the latter (hereinafter, simply "dimensions"), wherein each dimension is a descriptor describing a corresponding feature of the user behavior to be emulated. Each dimension may assume a corresponding plurality of different values, referred to as "dimension values".

According to an embodiment of the present invention, four classes of dimensions are provided:

Interaction type dimension class: the dimensions of such class relate to the definition of which type of phenomenon is measured, such as for example: an application, a service class, an http page, a download, a content usage.

Temporal dimension class: the dimensions of such class relate to the time during which the phenomenon to be measured is carried out, such as for example within a day, and/or within a week and/or within a month.

Device and network dimension class: the dimensions of such class relate to the type of hardware (personal computer, smart phone, tablet . . . ), operating system and programs used by users for accessing the contents.

Geographical dimension class: the dimensions of such class specify how and where the users are geographically distributed, as well as the type of access employed by the latters (ADSL, wireless, mobile, and so on).

The concepts of the present invention apply also if a different number of dimension classes is considered, such as for example with a lower number of classes or with additional classes.

This peculiar way of defining the user behavior model through a subdivision of the user behavior in terms of dimensions allows to define the typology of the tests to be carried out, starting from a series of indicators about the QoE perceived by a user for a specific service.

According to an embodiment of the present invention, for each interaction type, the single steps with which such interaction type may be implemented are defined in terms of scripts to be automatically carried out by the agent units 130(i) for correctly assigning the task thereto based on a respective calendar (this aspect will be described in greater detail in the following of the description).

According to an embodiment of the present invention, the first phase 210 of the procedure 200 provides for generating a user behavior model by selecting specific dimensions within the abovementioned classes of dimensions to describe corresponding features of interest of the user behavior to be emulated. Then, the dimensions values for these selected dimensions are selected, for example based on log analysis, survey results, market data, focus groups, user interviews, and so on. From these data it is possible to obtain a minimum emulation scenario, which will be enriched by considering the objectives of the specific measure campaign.

An example of a user behavior defined in terms of dimensions according to the present invention is disclosed below.

User behavior of a group of users residing in Torino, Milano, Firenze, Roma which make accesses by means of a personal computer of type x, y, z with operating system w1, w2 through an ADSL line obtained through the commercial offer a, b, c every working day at a portal p for re-watching from 20:00 to 21:00 the afternoon program "xxx" and for watching the live program broadcasted by the TV channel u from 21:00 to 24:00.

Possible dimensions of said exemplificative user behavior are the following ones:

Dimension City (belonging to the Geographical dimension class), having the following dimension values: Torino, Milano, Firenze, Roma;

Dimension Device (belonging to the Device and network dimension class), having the following dimension values: personal computer of type x, personal computer of type y, personal computer of type z;

Dimension Operating system (belonging to the Device and network dimension class), having the following dimension values: operating system w1, operating system w2;

Dimension Connection (belonging to the Geographical dimension class), having the following dimension values: ADSL line obtained through the commercial offer a, ADSL line obtained through the commercial offer b, ADSL line obtained through the commercial offer c;

Dimension Day (belonging to the Temporal dimension class), having the following dimension value: every working day;

Dimension Access (belonging to the Interaction type dimension class), having the following dimension value: portal p;

Dimension Time1 (belonging to the Temporal dimension class), having the following dimension value: from 20:00 to 21:00;

Dimension Interaction1 (belonging to the Interaction type dimension class), having the following dimension value: program "xxt";

Dimension Interaction2 (belonging to the Interaction type dimension class), having the following dimension value: live program broadcasted by the TV channel u;

Dimension Time2 (belonging to the Temporal dimension class), having the following dimension value: from 21:00 to 24:00.

As can be seen from this example, according to an embodiment of the present invention, a user behavior model may be defined by selecting more (different) dimensions belonging to a same class (e.g., the dimensions City and Connection belong to the Geographical dimension class).

According to an embodiment of the present invention, user behavior models can be also defined in case the whole context knowledge is not known (for example because it is not possible to have all the real data of the desired user behavior model), or for emulating new application scenarios (for example because a new service, device, or network technology is launched). In these cases, some of the dimensions are lacking, and are replaced with corresponding variables.

The second phase 220 of the procedure 200 provides for implementing the user behavior model generated at phase 210 by defining which combinations of dimensions are to be used among the ones selected in phase 210 in order to form corresponding "dimension tables". Such operations are carried out by the test scheduler unit 153.

According to an embodiment of the present invention, a dimension table DT is a table having a matrix dimension of n, which expresses the relationships among the possible combinations of the dimension values of n dimensions chosen among the dimensions selected in phase 210. The definition of which combinations may be used depends on the predominant features of the desired measure. The way the dimension are selected to be combined is carried out based on the objective of the campaign to be implemented.

Making reference to the example at issue, four dimensions may be for example combined to generate two bi-dimensional dimension tables DT: a first dimension table DT1 combining the dimension Access with the dimension Day, and a second dimension table DT2 combining the dimension City with the dimension Device. According to another example, the same four dimensions may be combined differently for obtaining two different bi-dimensional dimension tables DT: a first dimension table DT1' combining the dimension City with the dimension Day, and a second dimension table DT2' combining the dimension Access with the dimension Device. According to a still further example, the same four dimensions may be combined to form a single four-dimensional dimension table DT.

Once the dimensions of a dimension table DT have been selected, the dimension table DT is generated. Specifically, according to an embodiment of the present invention, each element of a n-dimensional dimension table DT corresponding corresponds to a specific n-tuple of dimension values from the user behavior model. The elements of dimension tables DT are set using different instruments, such as log analysis, surveys, and/or a priori definitions of data relating to the hypothetical scenario to be modeled. According to an embodiment of the present invention, in case more than one dimension tables DT are formed, one of them is elected to be a main dimension table MDT. The main dimension table MDT is the dimension table DT that corresponds to the most important combinations of dimensions for the purposes of the desired monitoring.

Making reference to the example at issue, a possible main dimension table DTM may be a bi-dimensional dimension table DT corresponding to the combination of the dimension City (dimension values: Torino, Milano, Firenze, Roma) with the dimension Device (dimension values: personal computer of type x, personal computer of type y, personal computer of type z). An example of such main dimension table DTM corresponding to a very simplified scenario is depicted hereinbelow:

|  | City: Torino | City: Milano | City: Firenze | City: Roma |
| --- | --- | --- | --- | --- |
| Device: pc x | 1 | 2 | 1 | 1 |
| Device: pc y | 1 | 1 | 1 | 1 |
| Device: pc z | 0 | 4 | 0 | 2 | wherein the element "1" corresponding to the pair of dimension values (Torino, pc x) means that in the considered scenario, in the City of Torino resides one user possessing a personal computer of type x, the element "2" corresponding to the pair of dimension values (Milano, pc x) means that in the considered scenario, in the City of Milano reside two users possessing a personal computer of type x, and so on.

According to an embodiment of the present invention, the number, type and/or location of the agent units 130($i$) of the system 125 are set based on the elements of the main dimension table DTM, in such a way that the measures carried out by the agent units 130($i$) are performed in a way that suitably fits the user behavior to be emulated.

For example, making reference to the example at issue, according to an embodiment of the present invention, for each column of the main dimension table DTM, i.e., for each specific dimension value of the dimension City, a number na of agent units 130($i$) equal to the sum of elements of such column is located at the location corresponding to said dimension value. According to this embodiment of the invention, in the example at issue there will be na=2 agent units 130($i$) in Torino, na=7 agent units 130($i$) in Milano, na=2 agent units 130($i$) in Firenze, and na=4 agent units 130($i$) in Roma.

According to another embodiment of the invention, for each column of the main dimension table DTM, i.e., for each specific dimension value of the dimension City, a number na of agent units 130($i$) proportional to the sum of elements of such column is located at the location corresponding to said dimension value. Using for example a same proportionality coefficient of 2 for every column of the main dimension table DTM, in the example at issue there will be na=4 agent units 130($i$) in Torino, na=14 agent units 130($i$) in Milano, na=4 agent units 130($i$) in Firenze, and na=8 agent units 130($i$) in Roma.

According to a still further embodiment of the invention, a different proportionality coefficient may be used for each (group of) column(s) of the main dimension table DTM. For example, if the monitoring of the cities of Torino, Milano and Roma is considered more important than the one of the city of Firenze, the proportionality coefficients for the former three may be advantageously set higher than the one for the latter one.

Making again reference to the example at issue, once the number and location of the agent units 130($i$) are set, the type of agent units 130($i$) for each city is determined based on how the elements of the corresponding column are distributed in the rows of the main dimension table DTM. For example, the na agent units 130($i$) located in the city of Torino may be subdivided in the following way:

a number na/2 of agent units 130(i) will be of the type personal computer of type x;

a number na/2 of agent units 130(i) will be of the type personal computer of type y;

a number 0 of agent units 130(i) will be of the type personal computer of type z.

More generally, according to an embodiment of the present invention, the test scheduler unit 153 sets the number, type and/or location of the agent units 130(i) of the system 125 using the way the elements of the main dimension table DTM are distributed as guidelines.

Once the number, type and/or location of the agent units 130(i) are set, the test scheduler unit 153 is configured to assign to each agent unit 130(i) specific tests to be carried out for emulating the user behavior. Said tests are structured so as to comprise test cycles each one comprising in turn interaction operations with the telecommunications network. As mentioned in the foregoing, the same agent units 130(i) are further configured to carry out measures on parameters of the multimedia content stream 115 received during said tests.

The test scheduler unit 153 assigns to each agent unit 130(i) the typologies of the tests to be carried out, and the number of test repetitions to be carried out during corresponding time slots of a test time period. For example, the test time period may correspond to a day.

For this purpose, according to an embodiment of the present invention, a further table—referred to as "test table" TT—is generated, having a column for each time slot of the day, and a row for each test typology. Each element (referred to as interaction frequency) of the test table TT corresponding to a specific (time slot, test typology) pair indicates the number of repetitions of said specific test typology during said specific time slot of the day.

An exemplary test table TT corresponding to a case in which the day is subdivided in k=4 time slots TS(k) (TS(1)= Morning, TS(2)=Afternoon, TS(3)=Evening, TS(4)=Night) and in which j=3 different test typologies Ttype(z) (z=1, 2, 3) are provided is illustrated herein below:

|  | TS(1) | TS(2) | TS(3) | TS(4) |
|---|---|---|---|---|
| Ttype(1) | x(1, 1) | x(1, 2) | x(1, 3) | x(1, 4) |
| Ttype(2) | x(2, 1) | x(2, 2) | x(2, 3) | x(2, 4) |
| Ttype(3) | x(3, 1) | x(3, 2) | x(3, 3) | x(3, 4) | wherein x(1,1) is the number of repetitions of a test cycle TC(1) of the test typology Ttype(1) to be carried out during the Morning time slot TS(1), x(1,2) is the number of repetitions of a test cycle TC(1) of the test typology Ttype(1) to be carried out during the Afternoon time slot TS(2), and so on.

A test cycle TC(z) generally provides for carrying out interaction operations sets IOS(n) each one comprising a sequence of elementary test operations emulating the behavior of a user when interacting with the network 110 according to a specific behavior model. Non limitative examples of interaction operation sets IOS(n) may comprise the operations required for the transmission of a file from a server (e.g., connecting to the server through ftp, exchanging credentials, logging in, setting the correct directory, defining the way such file transmission has to be carried out, actually transmitting the file, logging out), operations required for using the browser for reading a first email and sending a second email (e.g., opening a browser on a provider page, opening login page, logging in, opening the inbox directory, reading the first email, selecting a new email option, selecting the recipients, writing the second email text, sending the second email, logging out), and so on.

Each one of said interaction operation sets IOS(n) comprised in a test cycle TC(z) may be repeated within the test cycle TC(z) with a corresponding interaction frequency If(n). Therefore, the duration of a test cycle TC(z) is obtained by summing the durations of the interaction operation sets IOS(n) comprised in the test cycle TC(z), each one multiplied by the corresponding interaction frequency If(n).

For each test typology Ttype(z), a minimum mT(z) and a maximum MT(z) duration of the corresponding test cycle TC(z) are set. In some cases, such as in case the multimedia content is a movie or a song, such two durations are equal.

The number of repetitions x(z,k) of a test cycle TC(z) of the test typology Ttype(z) to be carried out during a time slot TS(k) is set taking into consideration the ratio between the duration of such time slot TS(k) and the maximum duration MT(z) of the test cycle TC(z).

Once the number of repetitions x(z,k) of test cycles TC(z) that can be carried out in each time slot TS(k) is set, the available agent units 130(i) are accordingly allocated.

The third phase 230 of the procedure 200 is a configuration phase carried out by the agent configuration unit 154 for translating the user behavior models previously defined in computer program instructions (scripts) that can be executed by the agent units 130(i), and for making them available (or for directly providing them) to the agent units 130(i).

The agent configuration unit 154 is adapted to configure the agent units 130(i) by generating scripts which the agent units 130(i) are capable of automatically running starting from a predefined starting time and for a predefined duration.

In order to correctly operate, the agent units 130(i) have to be of the correct hardware typology, possess the correct software and interconnection capability, and be physically located in the selected location. These checks are partially provided in the configuration file of the central unit 140 and partially carried out by a human actor.

The first operation carried out by the configuration unit 154 according to an embodiment of the present invention is to collect required information from the dimension tables DT and the test table TT generated by the test scheduler unit 153, arranging them in a corresponding configuration table CT such as the following one.

|  | C(1) | C(2) | C(3) |
|---|---|---|---|
| 130(1) | c(1, 1) | c(1, 2) | x(1, 3) |
| 130(2) | c(2, 1) | c(2, 2) | x(2, 3) |
| ... | ... | ... | ... |
| 130(i) | c(i, 1) | c(i, 2) | x(i, 3) |

According to this embodiment of the invention, the configuration table CT comprises a row for each agent unit 130(i). For each agent unit 130(i) (i.e., for each row), the configuration table CT provides for arranging information corresponding thereto in three respective classes, each one corresponding to a column of the configuration table CT: agent information class (column C(1)), test information class (column C(2)), and test calendar information class (column C(3)).

The agent information class comprises information c(i, 1) about the agent units 130(i), such as their names, the geographical location thereof, the interconnection configuration thereof, details on their hardware and software equipment, and IP address of the monitoring network 145.

The test information comprises information c(i, 2) relating to specific details about the interaction operation sets IOS(n), and how they are arranged in test cycles TC(z) to be carried out by the agent units 130(*i*).

The test calendar information class comprises information c(i, 3) relating to calendars of the tasks to be carried out during the tests, which specifies which agent unit(s) 130(*i*) has(have) to execute which test cycle TC(z) and when.

The concepts of the present invention also apply to the case in which a different set of information are used to generate the configuration table CT, such as a subset of the information listed above.

Making for example reference to a test cycle TC(z) comprising an interaction operation set IOS(n) for the transmission of a file from a server through ftp to be carried out by an agent unit 130(*i*), the row corresponding to such agent unit 130(*i*) may comprise the following information:

c(i, 1):
Name=agente A
NameDescription=tlc00312060002
c(i, 2):
0_connessione=ADSL
0_RASClassID=101
0_tipoPOP=tlc00301
0_localita=Torino
0_numero=011xxx
0_username-yyy
0_password=www
0_FTPClassID=1
0_FTPNome=193.104.137.129
0_FTPusername=jjj
0_FTPpassword=kkk
0_FTPtotalTMO=300
0_FTPtestmode=GET
0-FTPremotefile=download/pippo
c(i, 3):
pause=20
group={ }
startat=04/12/2010 00:15
endat=31/12/2010 23:45

According to an embodiment of the present invention, based on the information arranged in the configuration table CT, the configuration unit 154 automatically generates a corresponding script for each agent unit 130(*i*), which comprises indications about the specific interaction operation set IOS(n) to be executed by the agent units 130(*i*) during the test cycle TC(z).

Then, the configuration unit 154 stores such calendars in a memory area whose address and access credentials are known to the agent units 130(*i*). For example, according to an embodiment of the present invention, said memory area may be located in a storage area 190 located on the central unit 140 itself (see FIG. 1).

Generally, the calendars may be different for each agent unit 130(*i*). According to an embodiment of the present invention, the calendars of the agent units 130(*i*) may be changed at any time.

An example of a possible script for an agent unit 130(*i*) may be structured in such a way to comprises the following four sections:

an identity section, which comprises a name and an identification code of the agent unit 130(*i*);
a credential section, which comprises credentials of the servers for the retrieval of the calendars and the results storing;
a task section, which comprises instructions relating to the tasks to be carried out by the agent unit 130(*i*);
a calendar section, which comprises calendars of the tasks to be carried out during the tests.

Each agent unit 130(*i*) is activated by copying, e.g., manually, an initial configuration comprising the address and the access credentials to the storage area 190 wherein the calendars are stored. Then, each agent unit 130(*i*) periodically accesses to the storage area 190 through the monitoring network 145, using the known credentials. Each agent unit 130(*i*) verifies if new tasks have been assigned thereto and, in the positive case, it retrieves them and, after the operations are concluded, it provides a corresponding advise to the system.

The fourth phase 240 of the procedure 200 according to an embodiment of the present invention provides for the actual execution of the test cycles TC(z) by the agent units 130(*i*) by running the corresponding scripts. Each agent unit 130(*i*) is capable of carrying out the tests autonomously, i.e., without the need of receiving further data/instructions from the system. Indeed, each agent unit 130(*i*) carries out the test by running the scripts that were loaded in the previous phase.

However, according to an embodiment of the present invention it is always possible to vary the tasks assigned to the agents 130(*i*) at any time, by performing again the phase 220 and/or the phase 230 of the procedure 200. In these cases, new scripts are generated. Each agent unit 130(*i*) is configured to periodically access the test and configuration repository 160 for checking whether new configurations are available.

During the execution of the tests, the agent units 130(*i*) carry out measures on parameters (e.g., bandwidth, jitter, delay, response time) of the received multimedia content stream 115, acquiring corresponding measured values. Subject to the correct identity verification of the agent unit 130(*i*) that has submitted the measured values, the measured values are acquired by the acquisition unit 150 through the monitoring network 145 and stored in the measured values repository unit 155.

According to an embodiment of the present invention, the measured values stored in the measured values repository unit 155 can be consulted in form of reports.

The processing unit 152 processes the acquired measured values acquired by the acquisition unit 150 for calculating corresponding QoE indicators indicative of the QoE as perceived by the user enjoying the multimedia content.

According to an embodiment of the present invention, the central unit 140 is further configured to store in the repository unit 155 a so-called "agent correct operation table" which comprises time indications relating to:

the last data transmission carried out by an agent unit 130(*i*);
the new data transmission awaited by an agent unit 130(*i*);
the last configuration downloaded;
the last task wait signal by an agent unit 130(*i*).

In case the agent unit 130(*i*) is not able to contact the central unit 140, the measured values are temporally stored locally, and provided to the central unit 140 once the contact is reestablished.

When an agent unit 130(*i*) is communicating with the central unit 140, the former does not carry out any measure.

The last phase 250 of the procedure 200 according to an embodiment of the present invention is directed to verify the correct operation of the agent units 130(*i*) and the coherence of the acquired measured values.

Regarding the first aspect, according to an embodiment of the present invention, the central unit 140 is configured to automatically check whether each agent unit 130($i$) is correctly carrying out its assigned task or not, and if some agent unit 130($i$) is in an error situation which cannot enable the correct dialog with the central unit 140 itself. Knowing whether each agent unit 130($i$) is correctly carrying out its assigned task or not is a very important issue, in order to be certain that the collected measure values correspond to the desired user behavior model.

These operations are carried out starting from the knowledge of the following information (already generated starting from phase 220) for each test typology Ttype(z):
- maximum test duration;
- maximum duration MT(z) of each test cycle TC(z);
- calendars of the tasks assigned to each agent unit 130($i$);
- information included in the agent correct operation table.

According to an embodiment of the invention, the check is automatically made for each monitoring unit 130($i$) by comparing the current time (i.e., the current time stamp) with the maximum duration MT(z) of the test cycle TC(z) carried out from the monitoring unit 130($i$), plus a fixed time required to the transmission of new data.

When an error situation relating to an agent unit 130($i$) is asserted through said check, the central unit 140 is configured to employ different error management policies, such as for example sending an error email to an operator, or carrying out a "ping" operation toward the agent unit 130($i$) through the monitoring network 145.

Examples of possible situations involving an agent unit 130($i$) or the communication between an agent unit 130($i$) and the central unit 140 are listed in the following.

An agent unit 130($i$) succeeds in accomplishing the test and communicating with the central unit 140 within the maximum duration MT(z). In this situation, no error is detected.

An agent unit 130($i$) succeeds in accomplishing the test within the maximum duration MT(z), but it fails in communicating with the central unit 140. In this situation, the measured values are kept by the agent unit 130($i$) for being retransmitted to the central unit 140. If the maximum duration MT(z) time plus a fixed time required to the transmission is expired, the server unit 140 sends an alarm.

An agent unit 130($i$) fails in accomplishing the test within the maximum duration MT(z) and blocks itself. In this situation, since the agent unit 130($i$) is provided with a control system knowing the maximum duration MT(z), after the expiration of this time, the agent unit 130($i$) automatically reboots itself and passes to the following test.

An agent unit 130($i$) fails in accomplishing the test within the maximum duration MT(z) but responds to the control system ping. In this situation, the test is failed with a timeout error, and the agent unit 130($i$) passes to the following test.

According to an embodiment of the present invention, during phase 250, the central unit 140 is further configured to verify the coherence of the measured values acquired by the agent units 130($i$).

For this purpose, according to an embodiment of the invention, the central unit 140 generates from the configuration table CT outputted by the test scheduler unit 153 and from the calendars outputted by the agent configuration unit 154, a multi-dimensional table, referred to as "completion status table", whose data provide an indication about the correct or incorrect execution status of the single tests carried out by the single agent units 130($i$).

The completion status table is used to verify the completion status of the data stored in the test repository unit 160. Such verification is used both for reporting the measures and for generating possible critical situation signaling.

For example, it is possible to create a report for allowing a user of the system 125 to consult the completion status table, indicating whether the number of relates to the expected sample survey or to a subset thereof. This report may comprise data aggregated according to selected dimensions that may correspond to the ones selected in phases 210-220 of the procedure, or that may be a subset thereof.

Moreover, a set of critical situation signaling rules may be applied to the data contained in the completion status table in order to point out possible critical situations with respect to the user behavior model implemented by the system 125.

A first exemplary report, which relates to the completion status table of tests according to the dimension values Roma, Milano, Napoli, Firenze, Torino of a dimension City, is disclosed herein below:

| | |
|---|---|
| Roma | 97% |
| Milano | 82% |
| Napoli | 89% |
| Firenze | 75% |
| Torino | 67% | wherein for each dimension value it is reported the percentage of collected measured values with respect to the total amount. An exemplary critical situation signaling rule may provide for having a percentage of collected measured values lower than 80% of the expected total amount. In this example, according to said rule, the cities of Firenze and Torino corresponds to critical situations to be signaled.

A second exemplary report, which relates to the completion status table of tests according to the dimension values Device 1, Device 2, Device 3 of a dimension Device, and for the dimension values Morning, Afternoon, Evening, Night of a dimension Time slot, is disclosed herein below:

| | Device 1 | Device 2 | Device 3 |
|---|---|---|---|
| Morning | 90% | 79% | 100% |
| Afternoon | 43% | 92% | 99% |
| Evening | 100% | 100% | 56% |
| Night | 100% | 86% | 77% | wherein for each combination of Device/Time slot dimension values it is reported the percentage of collected measured values with respect to the total amount. An exemplary critical situation signaling rule may provide for having a percentage of collected measured values lower than 75% of the expected total amount. In this example, according to said rule, the combinations Device 1/Afternoon and Device 3/Evening correspond to critical situations to be signaled.

The previous description presents and discusses in detail several embodiments of the present invention; nevertheless, several changes to the described embodiments, as well as different invention embodiments are possible, without departing from the scope defined by the appended claims.

The invention claimed is:

1. A method for estimating a quality of experience of a user receiving an information content stream distributed through a telecommunications network, the method comprising:

generating a user behavior model, depicting a behavior of a user in an interaction with the telecommunications network, by considering a corresponding set of user behavior dimensions, each user behavior dimension being a descriptor describing a corresponding feature of the behavior;

implementing the user behavior model by selecting combinations of user behavior dimensions of the set of user behavior dimensions;

providing monitors to perform measures on specific parameters of the information content stream and to emulate the behavior of the user in the interaction with the telecommunications;

setting the monitors, the setting the monitors comprising setting a number, type and/or location of the monitors based on the selected combinations of user behavior dimensions;

assigning to the monitors test cycles comprising interaction operations with the telecommunications network to be carried out by the monitors;

generating for each monitor a corresponding script to be executed by the monitor based on the selected combinations of dimensions and the assigned test cycles, the script comprising indications about the interaction operations of the assigned test cycles;

at the monitors, carrying out the test cycles by running the generated scripts, and carrying out measurements on parameters of an information content stream received in response to the test cycles to obtain acquired measured values, and calculating quality of experience indicators by processing the acquired measured values.

2. The method of claim 1, further comprising:
providing a set of different test typologies, and
partitioning a test time period into a set of time slots, wherein:
the assigning to the monitors test cycles comprises generating a second table comprising a plurality of second elements, each second element providing an indication of a number of repetitions of test cycles of a corresponding test typology to be carried out during a corresponding time slot.

3. The method of claim 2, further comprising generating a third table listing, for each monitor, at least one among:
information about a name of the monitor;
information about a geographical position of the monitor;
information about an interconnection configuration of the monitor;
information about software and/or hardware equipment of the monitor;
details about the interaction operations to be carried out and how the interaction operations are arranged in test cycles;
a test calendar comprising information specifying which test cycle(s) to be carried out by monitor and when, wherein
the generating for each monitor a corresponding script comprises generating the script based on the third table.

4. The method of claim 3, wherein the generating the third table comprises generating the third table based on the first elements of the first table and on the second elements of the second table.

5. The method of claim 2, wherein the implementing the user behavior model further comprises:

for each test cycle to be carried out during a time slot, setting a corresponding maximum duration of the test cycle; and
setting the second elements of the second table based on the corresponding maximum durations and on a duration of the time slots.

6. The method of claim 5, further comprising verifying correct operations of the monitors by comparing for each monitor a current time with the maximum duration of the test cycle carried out by the monitor.

7. The method of claim 2, further comprising generating a fourth table listing:
a last data transmission carried out by a monitor;
a new data transmission awaited by a monitor;
a last configuration downloaded by a monitor;
a last task wait signal by an agent, wherein:
the method further comprises verifying a coherence of the acquired measured values based on the fourth table.

8. The method of claim 1, wherein each user behavior dimension of the set of user behavior dimensions may assume a plurality of different user behavior dimension values, the implementing the user behavior comprising generating at least one first table comprising a plurality of first elements, each first element quantifying a relationship among dimension values of the dimensions of the set of user behavior dimensions.

9. The method of claim 8, wherein the setting the number, type and/or location of the monitors comprises setting the number, type and/or location of the monitors according to elements of the first table.

10. A system for estimating a quality of experience of a user receiving an information content stream distributed through a telecommunications network, the system comprising a plurality of monitors to perform measures on specific parameters of the information content stream, and a central circuitry interfaced with the monitors, the central circuitry being configured to:

generate a user behavior model, depicting a behavior of a user in an interaction with the telecommunications network, by considering a corresponding set of user behavior dimensions, each user behavior dimension being a descriptor describing a corresponding feature of the behavior;

implement the user behavior model by selecting combinations of user behavior dimensions of the set of user behavior dimensions;

assign to the monitors test cycles comprising interaction operations with the telecommunications network to be carried out by the monitors;

generate for each monitor a corresponding script to be executed by the monitor based on the selected combinations of dimensions and based on the assigned test cycles, the script comprising indications about the interaction operations of the assigned test cycles, wherein the monitors are configured to carry out the test cycles by running the generated scripts, and carry out measurements on parameters of the information content stream received in response to the test cycles to obtain acquired measured values, and the central circuitry is further configured to calculate quality of experience indicators by processing the acquired measured values.

* * * * *